(12) United States Patent
Kaneyasu et al.

(10) Patent No.: US 9,481,324 B2
(45) Date of Patent: Nov. 1, 2016

(54) VEHICLE BATTERY CHARGER

(71) Applicant: Hitachi Cable, Ltd., Tokyo (JP)

(72) Inventors: Masayoshi Kaneyasu, Hitachi (JP);
Takafumi Kai, Isehara (JP); Hiroyuki Yanagisawa, Hitachi (JP); Hiroyuki Ito, Kasama (JP)

(73) Assignee: Hitachi Metals, Ltd., Tokyo (JP)

( * ) Notice: Subject to any disclaimer, the term of this patent is extended or adjusted under 35 U.S.C. 154(b) by 498 days.

(21) Appl. No.: 13/684,332

(22) Filed: Nov. 23, 2012

(65) Prior Publication Data

US 2013/0134936 A1 May 30, 2013

(30) Foreign Application Priority Data

Nov. 25, 2011 (JP) ................. 2011-257279

(51) Int. Cl.
*H02J 7/00* (2006.01)
*B60R 16/00* (2006.01)
*B60L 3/00* (2006.01)
*B60L 3/12* (2006.01)
*B60L 11/18* (2006.01)

(52) U.S. Cl.
CPC ............... *B60R 16/00* (2013.01); *B60L 3/00* (2013.01); *B60L 3/12* (2013.01); *B60L 11/1816* (2013.01); *B60L 2230/12* (2013.01); *Y02T 10/7005* (2013.01); *Y02T 10/7011* (2013.01); *Y02T 10/7088* (2013.01); *Y02T 90/121* (2013.01); *Y02T 90/14* (2013.01); *Y02T 90/16* (2013.01)

(58) Field of Classification Search
CPC ..................................................... Y02T 90/12

USPC ................................................. 320/109, 107
See application file for complete search history.

(56) References Cited

U.S. PATENT DOCUMENTS

| 8,025,526 | B1 * | 9/2011 | Tormey | B60L 3/0069 320/109 |
|---|---|---|---|---|
| 2010/0010698 | A1 * | 1/2010 | Iwashita et al. | 701/22 |
| 2011/0022222 | A1 * | 1/2011 | Tonegawa | 700/232 |
| 2011/0057611 | A1 * | 3/2011 | Nakaso | B60K 6/445 320/109 |
| 2011/0074351 | A1 * | 3/2011 | Bianco | B60L 11/1816 320/109 |
| 2012/0029728 | A1 * | 2/2012 | Hirayama | B60L 11/1838 701/1 |

FOREIGN PATENT DOCUMENTS

JP 2011-182640 A 9/2011

\* cited by examiner

*Primary Examiner* — Drew A Dunn
*Assistant Examiner* — Zixuan Zhou
(74) *Attorney, Agent, or Firm* — Roberts Mlotkowski Safran Cole & Calderon, PC (57) ABSTRACT

A vehicle battery charger for charging a vehicle that is operable to detect a disengagement of a connecter or a preparing operation of the disengagement of the connector by a change in an electric current value of an electric current output from a terminal of the connecter and to stop charging a storage battery of the vehicle upon the detection includes a charging device configured to charge the vehicle, and a simulation operation device configured to change the electric current value by switching a pathway of the electric current output from the terminal of the connecter in a state that the connecter is in engagement and the preparing operation of the disengagement of the connecter is not carried out so as to cause the vehicle to stop charging the storage battery.

6 Claims, 6 Drawing Sheets

VEHICLE BATTERY CHARGER

The present application is based on Japanese patent application No. 2011-257279 filed on Nov. 25, 2011, the entire contents of which are incorporated herein by reference.

BACKGROUND OF THE INVENTION

1. Field of the Invention

This invention relates to a vehicle battery charger for charging a vehicle with an electric motor as a drive source for driving such as a so-called "plug-in hybrid vehicle" or an electric car.

2. Description of the Related Art

In recent years, with consideration for environmental problems, vehicles that have a motor as a driving source for travelling thereof are becoming common. As a charging stand for charging the vehicles like this, for example, a charging stand disclosed in JP-A-2011-182640 is known.

The charging stand disclosed in JP-A-2011-182640 is configured to form a plurality of housing voids in a stand main body, and house an outlet unit in each of the housing voids. This charging stand is capable of charging a plurality of electric cars connected to the stand main body simultaneously.

SUMMARY OF THE INVENTION

By the way, the charging current that vehicles take in when the charging is carried out is varied according to the type of vehicle. In the charging stand capable of charging a plurality of vehicles simultaneously, if a contact is concluded with an electric supply company, based on the maximum electric power required when only vehicles taking in a large charging current are connected, electric price is increased, as a result, the burden of the charging stand user is increased, thus it leads to inhibition of an enhancement in the availability of the plug-in hybrid vehicle, electric car and the like. On the other hand, if an amperage contracted with the electric supply company is small, a case may occur that the charging is not carried out to a part of the plurality of vehicles connected to the charging stand at all.

In particular, in recent years, vehicles that comply with SAEJ1772 of an international standard that defines communications specification between the charging stand side and the vehicle side and the like have been increased. If the vehicles are configured to comply with the standard, the amount of charging among the plurality of vehicles connected to the charging stand can be adjusted by controlling the charging current supplied to the vehicles by the communications with the vehicle side, and temporarily stopping the charging in order to allocate the charging current to the other vehicles, but the above adjustment cannot be applied to vehicles that does not comply with the standard.

Accordingly, it is an object of the invention to provide a vehicle battery charger that is capable of causing a vehicle to stop and restart charging a battery thereof even when the vehicle is not adapted to stop and restart charging the battery by the communications.

(1) According to one embodiment of the invention, a vehicle battery charger for charging a vehicle that is operable to detect a disengagement of a connecter or a preparing operation of the disengagement of the connector by a change in an electric current value of an electric current output from a terminal of the connecter and to stop charging a storage battery of the vehicle upon the detection comprises:

a charging device configured to charge the vehicle; and
a simulation operation device configured to change the electric current value by switching a pathway of the electric current output from the terminal of the connecter in a state that the connecter is in engagement and the preparing operation of the disengagement of the connecter is not carried out so as to cause the vehicle to stop charging the storage battery.

In the above embodiment (1) of the invention, the following modifications and changes can be made.

(i) The simulation operation device is configured to cause the vehicle to detect the disengagement of the connecter by blocking the pathway of the electric current output from the terminal of the connecter.

(ii) The simulation operation device is configured to cause the vehicle to detect the preparing operation of the disengagement of the connecter by switching the pathway of the electric current output from the terminal of the connecter such that the electric current value of the electric current is equal to the electric current value obtained when the preparing operation has been carried out.

(iii) The simulation operation device is capable of selecting blocking the pathway of the electric current output from the terminal of the connecter, or switching the pathway of the electric current output from the terminal of the connecter such that the electric current value of the electric current is equal to the electric current value obtained when the preparing operation has been carried out.

Points of the Invention

According to one embodiment of the invention, a vehicle battery charger is constructed such that a simulation operation device is provided therein that causes the vehicle to detect the disengagement of the charging connector or the preparing operation of the disengagement even when the charging connector is actually engaged to the vehicle inlet. Thereby, the vehicle battery charger is operable to cause the vehicle to interrupt the charging of the battery without informing the vehicle of an abnormality while enabling the vehicle to restart the charging of the battery subsequently.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

An example of a vehicle battery charger and a vehicle charging system according to the embodiment of the invention will be explained below referring to FIGS. 1 to 4.

Configuration of Battery Charger for Vehicle

Figure 1:
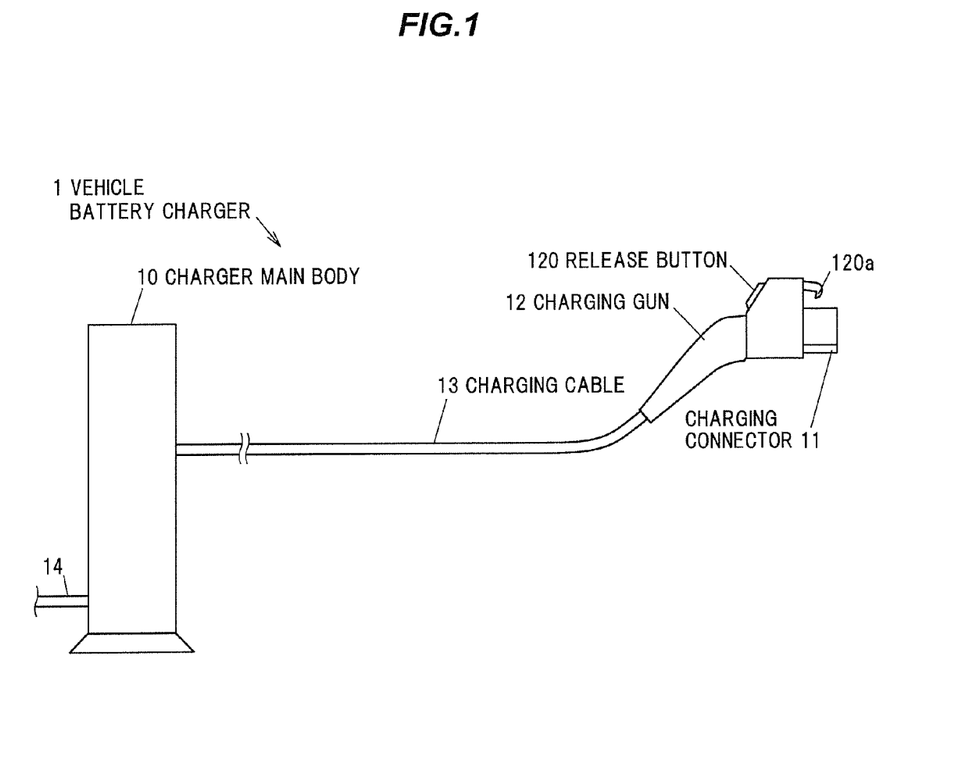
FIG. 1 is an explanatory view schematically showing a configuration of a vehicle battery charger according to a first embodiment of the invention.

FIG. 1 is an explanatory view schematically showing a configuration of a vehicle battery charger according to a first embodiment of the invention.

The vehicle battery charger 1 is configured to include a charging gun 12 in which a charging connector 11 is formed at the top end thereof, a charging cable 13 connected to the charging connector 11 in the charging gun 12, and a charger main body 10 configured to carry out charging of a vehicle 9 described below via charging cable 13 and the charging connector 11. A commercial power supply of 200 VAC is supplied to the charger main body 10 via a power supply cable 14. Specification of each component of the vehicle battery charger 1 complies with SAEJ1772.

The vehicle battery charger 1 is installed in, for example, a charging stand formed in a parking area of a service area of an express highway, a shopping mall, or an apartment house and building at multiple units, and provides a charging service for unspecified users. The charger main body 10 is installed so as to be self-standing on the ground of the parking area or the like.

In the charging gun 12, a release button 120 and a latching projection 120a as a latching part are formed. The latching projection 120a is configured to operate in conjunction with a push-operation of the release button 120.

Configuration of Charging System for Vehicle

Figure 2:
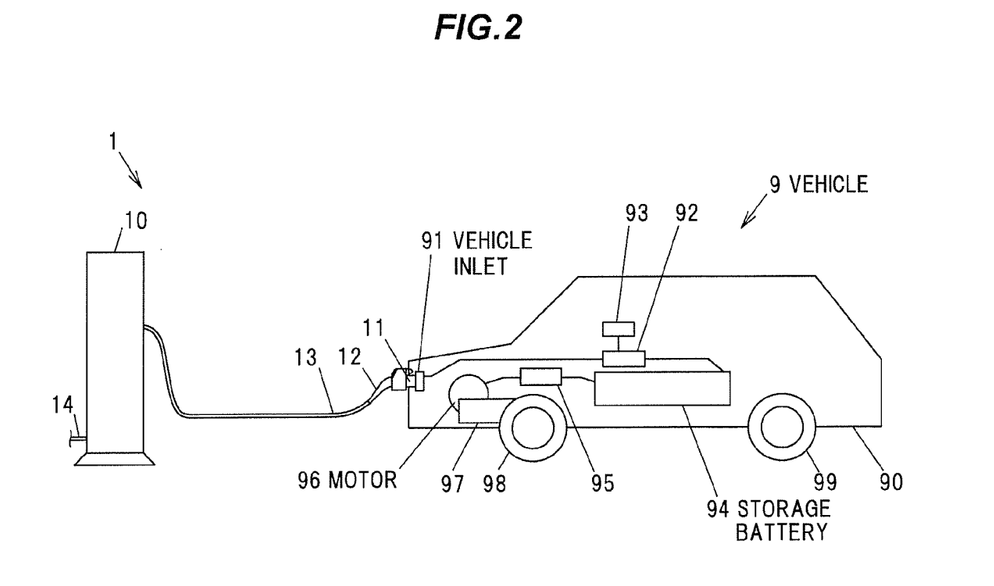
FIG. 2 is an explanatory view schematically showing a configuration of a vehicle battery charger and a vehicle.

FIG. 2 is an explanatory view schematically showing a configuration in a use situation of the vehicle battery charger according to the embodiment of the invention.

The vehicle 9 connected to the vehicle battery charger 1 is an electric car mounting a motor 96 as a driving source for travelling in a vehicle body 90. In addition, the vehicle body 90 is configured to mount thereon a vehicle inlet 91 engaged with the charging connector 11, a charging control circuit 92 connected to the input terminal of the vehicle inlet 91, a control device 93 configured to control the charging control circuit 92, a storage battery 94 and an inverter 95 configured to supply electric power stored in the storage battery 94 to the motor 96 as a motor current to which switching is applied by pulse width modulation (PWM) control, and a transmission 97 configured to change gear the output of the motor 96 and transmit to front wheels 98.

The motor 96 is comprised of, for example, an interior permanent magnet motor (IPM). The storage battery 94 is comprised of, for example, a lithium ion battery having a plurality of cells.

Further, the vehicle 9 may be a plug-in hybrid vehicle including an engine fueled by a volatile liquid such as gasoline as a driving source in addition to the motor 96. In addition, a rear drive vehicle configured to transmit the output of the transmission 97 to rear wheels 99 may be also used.

The latching projection 120a (refer to FIG. 1) of the charging gun 12 is configured to engage with the vehicle inlet 91 so as to prevent the charging connector 11 from unintended disengagement from the vehicle inlet 91. The latching projection 120a is configured to operate in conjunction with a push-operation of the release button 120, thus the engagement between the latching projection 120a and the vehicle inlet 91 is released by pushing the release button 120, and it becomes possible to carry out an extracting operation of the charging connector 11.

Configuration of Charging Connector 11

Figure 3:
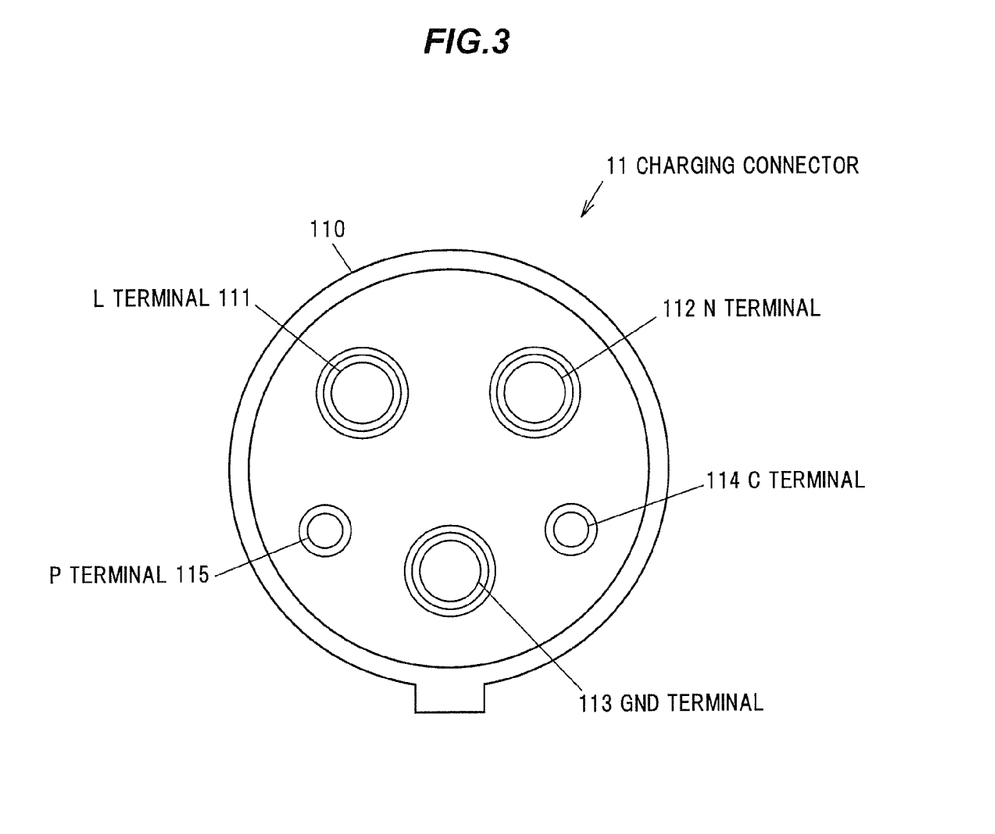
FIG. 3 is a front view schematically showing a configuration of a charging connecter.

FIG. 3 is a front view schematically showing a configuration of a charging connecter from the terminal side.

The charging connector 11 is configured to include a housing 110, an L terminal 111 and an N terminal 112 as a pair of charging current output terminal configured to output voltage for charging of the vehicle 9, a GND terminal 113 electrically connected to ground, a C terminal 114 as a charging control terminal, and a P terminal 115 as a proximity detection terminal configured to detect the proximity to the vehicle inlet 91.

Circuit Configuration of Vehicle Battery Charger 1

Figure 4:
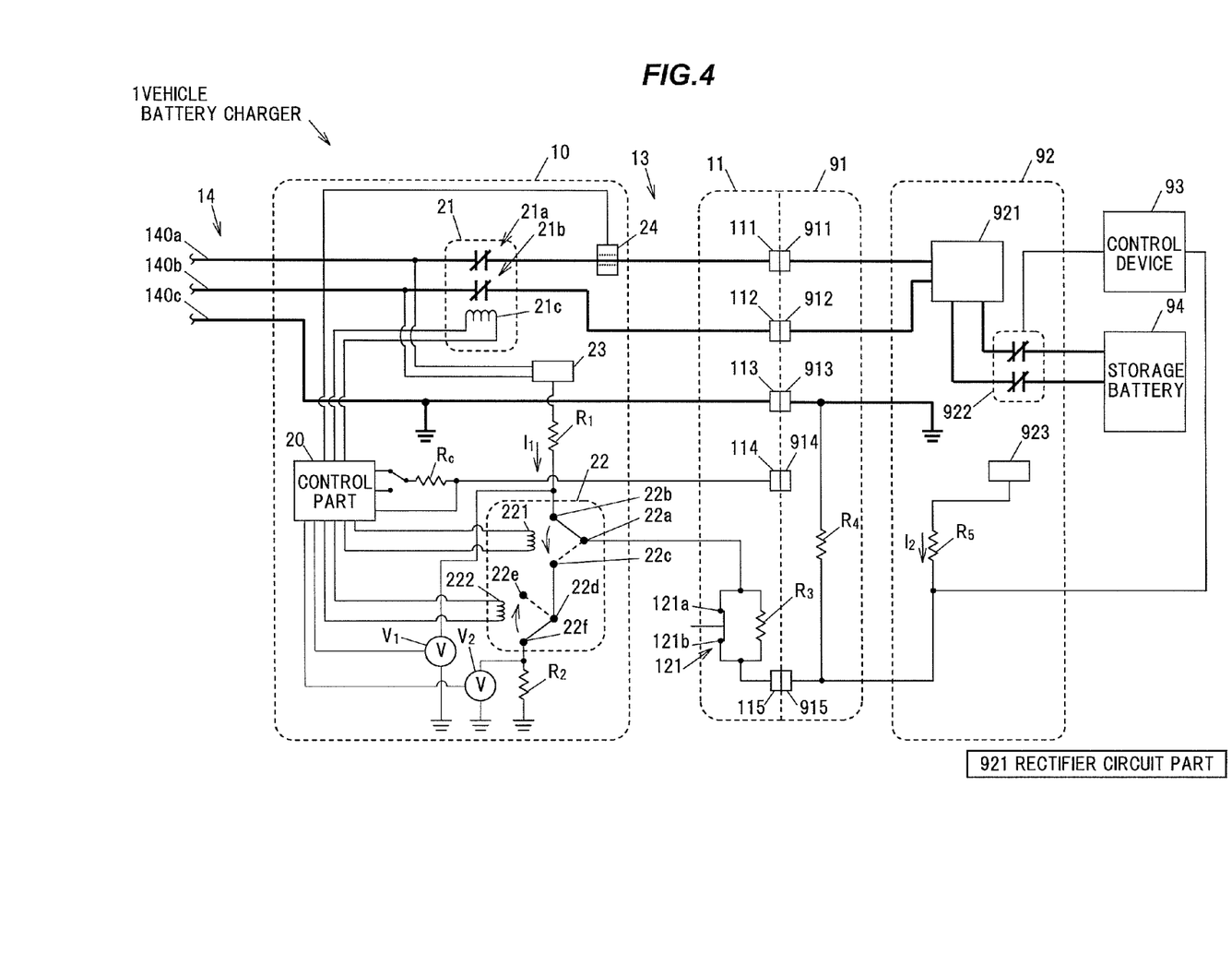
FIG. 4 is a circuit diagram schematically showing a configuration of a vehicle battery charger according to the first embodiment and a vehicle.

FIG. 4 is a circuit diagram schematically showing an example of configuration of the vehicle battery charger 1, and the vehicle inlet 91, the charging control circuit 92, the control device 93 and the storage battery 94 located on the part of the vehicle 9.

The charger main body 10 of the vehicle battery charger 1 includes a control part 20 configured to control the supply, block and the like of the charging current toward the side of the vehicle 9. The control part 20 includes, for example, a central processing unit (CPU) configured to operate in accordance with a program preliminarily stored, and a peripheral circuit thereof.

The control part 20 is configured to control ON (relay) or OFF (block) of a relay circuit 21 installed in the charger main body 10. The control part 20 and the relay circuit 21 are one example of the charging device of the invention. The relay circuit 21 is configured to include a first contact part 21a, a second contact part 21b and a coil 21c configured to allow the first contact part 21a and second contact part 21b to operate, and when electric current is supplied to the coil 21c from the control part 20, the first contact part 21a and second contact part 21b become an ON-state (closed state) and when electric current is not supplied to the coil 21c, both of the first contact part 21a and second contact part 21b become an OFF-state (open state).

The first contact part 21a of the relay circuit 21 is installed between a voltage line 140a of the power supply cable 14 and the L terminal 111 of the charging connector 11 connected to the charger main body 10 via the charging cable 13. In addition, the second contact part 21b is installed between a neutral line 140b of the power supply cable 14 and the N terminal 112 of the charging connector 11 connected to the charger main body 10 via the charging cable 13. Due to this, when electric current is supplied to the coil 21c from the control part 20, conduction state is formed between the voltage line 140a and the L terminal 111, and between the neutral line 140b and the N terminal 112.

A current sensor 24 is installed in a wiring between the first contact part 21a and the L terminal 111. The current sensor 24 is, for example, configured to be comprised of a Hall element sensor, and detect electric current output from the L terminal 111 so as to output the detection signal showing the electric current value thereof to the control part 20.

In addition, the control part 20 is configured to control a switching circuit 22 installed in the charger main body 10. The switching circuit 22 is configured to include a first coil 221 and a second coil 222, and control the supply of electrical current to the first coil 221 and the second coil 222 individually, thereby connection states among first to sixth contacts 22a to 22f can be switched.

When the power distribution to the first coil 221 is not carried out, the first contact 22a and the second contact 22b become a connected state, and when the power distribution to the first coil 221 is carried out, the first contact 22a and the third contact 22c become a connected state. In addition, when the power distribution to the second coil 222 is not carried out, the fourth contact 22d and the sixth contact 22f become a connected state, and when the power distribution to the second coil 222 is carried out, the fourth contact 22d and the fifth contact 22e become a connected state. In an initial state of the charger main body 10 (a state of being not connected to the vehicle 9), the power distribution to both of the first coil 221 and the second coil 222 is not carried out.

The first contact 22a is connected to a switch 121 disposed in the charging gun 12 via the charging cable 13. The switch 121 includes two contacts 121a, 121b that are configured to operate in conjunction with a push-operation of the release button 120 of the charging gun 12, and become a conduction state at the normal time when the release button 120 is not pushed and become an insulation state when the release button 120 is pushed. The contact 121a is connected to the first contact 22a of the switching circuit 22 and the contact 121b is connected to the P terminal 115 of the charging connector 11.

To the second contact 22b, one end of a first resistor $R_1$ installed in the charger main body 10 is connected. Another end of the first resistor $R_1$ is connected to a voltage output part 23. The voltage output part 23 is a direct current power supply that is configured to transform an alternating current supplied from the voltage line 140a and the neutral line 140b, for example, to a direct current of 5 V so as to output. In addition, the first resistor $R_1$ has a resistance value of, for example, 2700Ω.

The third contact 22c and the fourth contact 22d are connected in the switching circuit 22. The fifth contact 22e is connected to none of the other circuit elements both inside and outside of the switching circuit 22 so as to be electrically isolated.

In addition, to the sixth contact 22f, one end of a second resistor $R_2$ is connected. Another end of the second resistor $R_2$ is configured to electrically be connected to ground, and have the same electric potential (reference potential) as the ground line 140c of the power supply cable 14. The second resistor $R_2$ has a resistance value of for example, 150Ω.

In addition, to the switch 121, a third resistor $R_3$ is connected in parallel. One end of the third resistor $R_3$ is connected to the contact 121a, and another end thereof is connected to the contact 121b. The third resistor $R_3$ has a resistance value of, for example, 330Ω.

Due to this, in an initial state of the charger main body 10, the first resistor $R_1$ is connected (short-circuited) to the P terminal 115 via the switch 121. In the initial state, the voltage output part 23 can output a voltage from the P terminal 115 via the first resistor $R_1$, the switching circuit 22 (the second contact 22b and the first contact 22a) and the switch 121.

In addition, if the power distribution to the first coil 221 is carried out in a state that the power distribution to the second coil 222 is not carried out, one end of the second resistor $R_2$ is connected (short-circuited) to the P terminal 115 via the switch 121. Furthermore, if the power distribution to both of the first coil 221 and the second coil 222 is carried out, the contact 121a of the switch 121 is connected (short-circuited) to the fifth contact 22e.

To the second contact 22b of the switching circuit 22, a first voltmeter $V_1$ configured to detect the voltage (difference in potential from the reference potential) of the second contact 22b is connected. In addition, to the sixth contact 22f of the switching circuit 22, a second voltmeter $V_2$ configured to detect the voltage (difference in potential from the reference potential) of the sixth contact 22f is connected.

As the first voltmeter $V_1$ and the second voltmeter $V_2$, for example, an AD converter configured to convert an analogue signal into a digital signal can be used, and a comparator configured to compare the difference from (whether larger or smaller than) a predetermined voltage value can be also used. The detection signal showing the voltage value detected at the first voltmeter $V_1$ and the second voltmeter $V_2$ is output to the control part 20.

In addition, the control part 20 has a communication function that transmits information such as an allowable current value of the charging current to the side of the vehicle 9 by a pulse signal to which pulse width modulation (PWM) control is applied. The transmission signal from the control part 20 is output from the C terminal 114 of the charging connector 11 to the side of the vehicle 9 via a resistor for communication $R_c$. In addition, the control part 20 is configured to be able to monitor the voltage of the side of the C terminal 114 of the resistor for communication $R_c$. The resistor for communication $R_c$ is configured to communicate with the vehicles that comply with SAEJ1772.

Configuration of Vehicle 9 Side

The vehicle inlet 91 includes a first terminal 911, a first terminal 911, a second terminal 912, a third terminal 913, a fourth terminal 914 and a fifth terminal 915. When the vehicle inlet 91 is engaged with the charging connector 11, the first terminal 911 is connected to the L terminal 111, the second terminal 912 is connected to the N terminal 112, the third terminal 913 is connected to the GND terminal 113, the fourth terminal 914 is connected to the C terminal 114 and the fifth terminal 915 is connected to the P terminal 115 individually. The fifth terminal 915 is one example of the connecter terminal of the invention. A fourth resistor $R_4$ is connected between the third terminal 913 and the fifth terminal 915. The fourth resistor $R_4$ has a resistance value of, for example, 2700Ω.

The charging control circuit 92 includes a rectifier circuit part 921, a relay circuit 922, a direct current power supply 923 and a fifth resistor $R_5$. The fifth resistor $R_5$ has a resistance value of; for example, 330Ω. The direct current power supply 923 is configured such that the power supply voltage of the output thereof is, for example, 5 V. The fifth resistor $R_5$ is configured such that one end thereof is connected to the direct current power supply 923 and another end thereof is connected to the fifth terminal 915. With regard to the direct current power supply 923, there are two cases according to the type of vehicle 9, namely one is a case that the power supply voltage is always output, and another is a case that the power supply voltage is output when the charging voltage is applied to the first terminal 911 and the second terminal 912 from the vehicle battery charger 1 and the ignition switch operated by a driver is situated in an ON-state.

The rectifier circuit part 921 is connected to the first terminal 911 and the second terminal 912 of the vehicle inlet 91. The rectifier circuit part 921 is configured to rectify the alternating current input from the first terminal 911 and the second terminal 912 so as to output to the relay circuit 922. The rectifier circuit part 921 is comprised of, for example, a diode bridge circuit. Further, between the rectifier circuit part 921 and the relay circuit 922, an inrush current limiting circuit configured to limit an inrush current at the start of the charging can be further installed.

The relay circuit 922 is configured such that an ON-state (closed state) or an OFF-state (open state) thereof is controlled by the control device 93. When the relay circuit 922 becomes the ON-state, the storage battery 94 is charged by the electric power supplied from the first terminal 911 and the second terminal 912.

Also, the fifth resistor $R_5$ is configured such that one end thereof is connected to the control device 93. The control device 93 can detect the voltage (difference in potential from the reference potential) of one end of the fifth resistor $R_5$.

Further, the vehicle 9 according to the embodiment does not comply with SAEJ1772, and does not have a communication function with the vehicle battery charger 1, thus the transmission signal output from the control part 20 of the vehicle battery charger 1 to the C terminal 114 is not input to the control device 93. In case that the vehicle has the communication function, it can be detected that the charging connector 11 is engaged to the vehicle inlet 91 by the fact that the control part 20 has achieved a communication with the vehicle side, but in case that the vehicle does not have the communication function, it is necessary to detect the proximity of the charging connector 11 to the vehicle inlet 91 by the other methods.

In the embodiment, the proximity of the charging connector 11 to the vehicle inlet 91 is detected based on the voltage detected by the first voltmeter $V_1$. The proximity detection method will be explained below.

Proximity Detection Method

Upon the disengagement when the charging connector 11 is not engaged to the vehicle inlet 91, the switching circuit 22 is situated in a first connection state that the first contact 22a and the second contact 22b are connected to each other.

In the disengagement, a direct current of +5 V is supplied to the second contact 22b from the voltage output part 23 via the first resistor $R_1$, on the other hand, the P terminal 115 connected to the first contact 22a via the switch 121 is situated in an insulated state, thus the voltage of the second contact 22b detected by the first voltmeter $V_1$, namely the voltage of the P terminal 115 becomes +5 V.

Where the power supply voltage is outputted when the charging voltage is applied to the first terminal 911 and the second terminal 912 from the vehicle battery charger 1 and the ignition switch is situated in the ON-state, when the charging connector 11 is engaged to the vehicle inlet 91, the direct current power supply 923 does not output the power supply voltage at this time point, so that an electric current $I_1$ flows through the first resistor $R_1$ and the fourth resistor $R_4$ by the voltage supplied from the voltage output part 23, consequently the voltage of the second contact 22b detected by the first voltmeter $V_1$ is reduced than the case of the disengagement due to voltage drop in the first resistor $R_1$. In the embodiment, since the first resistor $R_1$ and the fourth resistor $R_4$ are configured to be equalized in the resistance value, the voltage detected by the first voltmeter $V_1$ becomes 2.5 V that is corresponding to one-half of the output voltage of the voltage output part 23. The control part 20 can detect the proximity of the charging connector 11 to the vehicle inlet 91 by the change in the voltage.

On the other hand, where the direct current power supply 923 always outputs the power supply voltage, when the charging connector 11 is engaged to the vehicle inlet 91, the voltage detected by the first voltmeter $V_1$ is changed from 5 V to 4.51 V, so that the control part 20 can detect the proximity of the charging connector 11 to the vehicle inlet 91 by the change in the voltage.

In addition, the control part 20 can determine whether the direct current power supply 923 of the vehicle 9 always outputs the power supply voltage, or it outputs the power supply voltage when the charging voltage is applied to the first terminal 911 and the second terminal 912 from the vehicle battery charger 1 and the ignition switch is situated in the ON-state, dependent on an amount of change in the voltage when the charging connector 11 and the vehicle inlet 91 are engaged to each other. In particular, the control part 20 can determine that the vehicle engaged is a vehicle configured to output the power supply voltage when the charging voltage is applied to the first terminal 911 and the second terminal 912 from the vehicle battery charger 1 and the ignition switch is situated in the ON-state, if the detected voltage of the first voltmeter $V_1$ when the charging connector 11 and the vehicle inlet 91 are engaged to each other is 2.5 V. However, even if the voltage is, for example, 4.51 V, the state may correspond to a state that merely the ignition switch is situated in the ON-state, thus it cannot be necessarily determined that the vehicle is a vehicle configured such that the direct current power supply 923 always outputs the power supply voltage. However, also in this case, there is no problem with regard to collateral of safety in the charging. The control part 20 stores the determination result.

Upon detecting the proximity of the charging connector 11 to the vehicle inlet 91, the control part 20 supplies electric current to the coil 21c of the relay circuit 21 so as to allow both of the first contact part 21a and the second contact part 21b to become the ON-state. Due to this, the vehicle battery charger 1 is situated in a state that the charging current can be output from the L terminal 111 and the N terminal 112. In addition, due to the fact that the charging voltage has been applied, the direct current power supply 923 outputs the power supply voltage.

In addition, upon detecting the proximity of the charging connector 11 to the vehicle inlet 91, the control part 20 immediately supplies electric current to the first coil 221c of the switching circuit 22 so as to switch the switching circuit 22 to the second connection state that the first contact 22a and the third contact 22c are connected to each other. Due to this, the connection between the first resistor $R_1$ and the P terminal 115 is blocked, and the second resistor $R_2$ and the P terminal 115 are connected to each other via the switch 121.

The switching to the second connection state is a procedure adopted for allowing the control device 93 of the side of the vehicle 9 to be able to detect that the release button 120 of the charging gun 12 has been pushed. Next, a method of detecting that the pushing operation of the release button 120 for the disengagement of the charging connector 11 from the vehicle inlet 91 and the preparing operation thereof has been carried out will be explained.

Method of Detecting Disengagement and Preparing Operation Thereof

In case that the release button 120 has been pushed by the user, there is a high possibility that the charging connector 11 is extracted from the vehicle inlet 91, thus for the purpose of preventing occurrence of spark due to the fact that the L terminal 111 and the first terminal 911 are separated, and the N terminal 112 and the second terminal 912 are separated in a live-line state, the control device 93 stops the charging to the storage battery 94 before the charging connector 11 is disengaged from the vehicle inlet 91. In the embodiment, by allowing the relay circuit 922 to be situated in the OFF-state, the charging to the storage battery 94 is stopped. In case that the above procedure is not carried out at the side of the vehicle 9, the control part 20 allows the relay circuit 21 to be situated in the OFF-state.

Further, if the charging to the storage battery 94 is stopped at the side of the vehicle 9, it can be adopted that on detecting that the release button 120 has been pushed, immediately the relay circuit 922 is situated in the OFF-state, but it can be also adopted that after the charging current is reduced to a slight current value (for example, 0.1 to 1 A), the relay circuit 922 is situated in the OFF-state. Due to this, spark that occurs between the connecter on the charging connector 11 and the vehicle inlet 91 is reduced, so as to reduce damages of the charging connector 11 and the vehicle inlet 91. In addition, this makes it possible to reduce welding of relay in the relay circuit 922.

When the release button 120 is pushed, the connection between the contact 121a and the contact 121b of the switch 121 is released, and the resistance value from one end of the fifth resistor $R_5$ to the ground potential is changed, thus electric current output from the fifth terminal 915 is also changed via the fifth resistor $R_5$. The control device 93 detects that the release button 120 has been pushed, based on the change of the voltage of one end of the fifth resistor $R_5$ associated with the above-mentioned change of the current value of the electric current.

In particular, the resistance value from another end of the fifth resistor $R_5$ to the ground potential is changed from the resistance value before the release button 120 is pushed (parallel resistance value of the second resistor $R_2$ and the fourth resistor $R_4$) to the parallel resistance value of the serial resistance of the second resistor $R_2$ and the third resistor $R_3$, and the fourth resistor $R_4$, so that the resistance value from one end of the fifth resistor $R_5$ to the ground potential is increased. As a result, the current value of the current $I_2$ that flows through the fifth resistor $R_5$ is changed, thus the voltage of one end of the fifth resistor $R_5$ is changed. The control device 93 detects that the release button 120 has been pushed, based on the above-mentioned change of the voltage, and allows the relay circuit 922 to be situated in the OFF-state.

In addition, the control part 20 of the charger main body 10 detects that the release button 120 has been pushed, based on the change of the voltage of the sixth contact 22f of the switching circuit 22 that is detected by the second voltmeter $V_2$. Namely, the resistance value from one end of the fifth resistor $R_5$ to the ground potential is changed by that the release button 120 has been pushed, and associated with this, electric current that flows through the second resistor $R_2$ is changed, thus the control part 20 detects that the release button 120 has been pushed, based on the change of the voltage of the sixth contact 22f. Based on the above-mentioned detection, the control part 20 stops the supply of electric current to the coil 21d of the relay circuit 21 as mentioned above so as to allow both of the first contact part 21a and the second contact part 21b to be situated in the open-state. For example, the voltage of the sixth contact 22f is lowered from +1.51 V to +0.86 V before and after the release button 120 has been pushed.

In addition, the control device 93 has a function that detects that the charging connector 11 is disengaged from the vehicle inlet 91, and also when the disengagement is detected, allows the relay circuit 922 to be situated in the OFF-state. This operation may be carried out in a case that, for example, the release button 120 has been pushed during one cycle when the control device 93 takes samples of the voltage of one end of the fifth resistor $R_5$ and the charging connector 11 has been disengaged from the vehicle inlet 91.

It can be also detected based on the change of the voltage of the sixth contact 22f that the charging connector 11 has been disengaged from the vehicle inlet 91, similarly to the case that the release button 120 has been pushed. Namely, when the charging connector 11 has been disengaged from the vehicle inlet 91, electric current does not flow from the fifth terminal 915 to the side of the vehicle battery charger 1, thus the current $I_2$ that flows through the fifth resistor $R_5$ is reduced, and associated with this, the pressure drop in the fifth resistor $R_5$ is reduced, so as to change the voltage of one end of the fifth resistor $R_5$. The control device 93 detects the disengagement of the charging connector 11 based on the above-mentioned change of the voltage, so as to allow the relay circuit 922 to be situated in the OFF-state based on the above-mentioned detection.

In addition, by the disengagement of the charging connector 11, electric current does not flow through the second resistor $R_2$, thus by the second voltmeter $V_2$ associated with this, the control part 20 detects the disengagement of the charging connector 11. In particular, when the charging connector 11 is disengaged from the vehicle inlet 91, the voltage of the sixth contact 22f becomes equal to the ground potential, thus the control part 20 detects the above-mentioned change of the voltage by the second voltmeter $V_2$, so as to stop the supply of electric current to the coil 21c of the relay circuit 21.

Charging Interruption Method

The vehicle battery charger 1 has a charging interruption function that interrupts the charging to the vehicle 9 without allowing the vehicle 9 to inform abnormality thereof. Namely, only by allowing the relay circuit 21 of the vehicle battery charger 1 to merely be situated in the OFF-state, a case may occur that the vehicle 9 recognizes as blackout of the system power supply or failure of the vehicle battery charger 1 so as to inform abnormality to the driver or the like, and this makes it impossible to carry out the restart of the charging after that, but according to the charging interruption function, after a lapse of a predetermined time, the charging can be restarted.

The charging interruption function is carried out by allowing the control device 93 of the vehicle 9 to conduct a pseudo-detection of the disengagement of the charging connector 11, and is fulfilled by a simulation operation device including the control part 20 and the switching circuit 22. The operation of the charging interruption by the simulation operation device is executed, for example, on receiving a command from an integration controller that integrates the whole of the charging stand, when electricity consumption nearly exceeds the rated value or the like based on increase in load of the charging stand.

The command is transmitted to the control part 20 via a signal line (not shown). Upon receiving the command to interrupt the charging to the vehicle 9, the control part 20 supplies electric current to the second coil 222 of the switching circuit 22. Further, at this time, electric current is supplied to the first coil 221, and the first contact 22a and the third contact 22c are connected to each other. By the power distribution to the second coil 222, the switching circuit 22 becomes a third connection state that the connection between the fourth contact 22d and the sixth contact 22f is blocked and simultaneously the fourth contact 22d and the fifth contact 22e are connected to each other.

As mentioned above, the fifth contact 22e is connected to none of the other circuit elements, thus by supplying electric current to the second coil 222 of the switching circuit 22, electric current that flows from the P terminal 115 into the side of the vehicle battery charger 1 has nowhere to go. Namely, pathway of electric current output from the fifth terminal 915 is blocked, and electric current does not flow into the side of the vehicle battery charger 1, thus the current $I_2$ that flows through the fifth resistor $R_5$ is reduced, and associated with this, the pressure drop in the fifth resistor $R_5$ is reduced, so as to change the voltage of one end of the fifth resistor $R_5$. Based on the above-mentioned change of the voltage, the control device 93 judges that the charging connector 11 is disengaged from the vehicle inlet 91 so as to allow the relay circuit 922 to be situated in the OFF-state as mentioned above even when the charging connector 11 is actually not disengaged.

In addition, the control part 20 allows the relay circuit 21 to be situated in the OFF-state after confirming that the output of the charging current to the vehicle 9 is stopped or reduced by the current sensor 24. Due to this, both of the relay circuit 922 of the vehicle 9 and the relay circuit 21 of the vehicle battery charger 1 are situated in the OFF-state, so that the charging interruption state is realized.

Charging Waiting Processing Method

In case of allowing the vehicle 9 to wait in a state that the charging to the vehicle 9 is interrupted, the processing of the side of the vehicle battery charger 1 varies depending on whether the vehicle 9 always outputs the voltage of the direct current power supply 923 or the vehicle 9 outputs the voltage of the direct current power supply 923 when the charging voltage is applied to the first terminal 911 and the second terminal 912 from the vehicle battery charger 1 and the ignition switch is situated in the ON-state.

In case that the vehicle 9 always outputs the voltage of the direct current power supply 923, the control part 20 carries out the power distribution to the first coil 221 in a state of allowing the relay circuit 21 to be situated in the OFF state, so as to provide the second connection state that the power distribution to the second coil 222 is not carried out. Due to this, when the charging connector 11 is actually disengaged from the vehicle inlet 91, the vehicle 9 and the vehicle battery charger 1 become capable of detecting the disengagement of the charging connector 11 by the second voltmeter $V_2$.

On the other hand, in case that the vehicle 9 outputs the voltage when the charging voltage is applied to the first terminal 911 and the second terminal 912 from the vehicle battery charger 1 and the ignition switch is situated in the ON-state, the control part 20 blocks the supply of electric current to the first coil 221 and the second coil 222 so as to allow the switching circuit 22 to be situated in the first connection state. Due to this, when the charging connector 11 is actually disengaged from the vehicle inlet 91, the control part 20 becomes capable of detecting the disengagement. Here, the blocking of the current supply to the first coil 221 and the second coil 222 can be carried out intermittently at regular time intervals, or can be also carried out on receiving a command from an integration controller that integrates the whole of the charging stand.

In addition, in case that the ignition switch is situated in the ON-state, the control part 20 detects this by the change of the voltage detected by the first voltmeter $V_1$, and carries out the power distribution to the first coil 221 so as to allow the switching circuit 22 to be situated in the second connection state. Due to this, the vehicle 9 can detect that the charging connector 11 and the vehicle inlet 91 are situated in the proximity, so that the vehicle 9 can be prevented from driving forward in the proximity.

Charging Restart Processing Method

The restart of the charging to the vehicle 9 is carried out, for example, on receiving a command from the integration controller that integrates the whole of the charging stand. The processing of the control part 20 when the command is received varies depending on whether the vehicle 9 always outputs the voltage of the direct current power supply 923 or the vehicle 9 outputs the voltage of the direct current power supply 923 when the charging voltage is applied to the first terminal 911 and the second terminal 912 from the vehicle battery charger 1 and the ignition switch is situated in the ON-state.

In case that the vehicle 9 always outputs the voltage of the direct current power supply 923, the control part 20 once carries out the power distribution to the second coil 222, and after a predetermined time, blocks the supply of electric current to the second coil 222. The power distribution time to the second coil 222 is a time that the vehicle 9 can surely recognize the change of the connection state of the switching circuit 22 (the change of the voltage of one end of the fifth resistor $R_5$), for example, not less than 1 second, preferably 3 to 5 seconds. Due to this, the vehicle battery charger 1 (the simulation operation device comprised of the control part 20 and the switching circuit 22) allows the control device 93 of the vehicle 9 to detect a state that the charging connector 11 is once disengaged from the vehicle inlet 91 and are then engaged thereto again in a simulated state. This measure is taken for allowing the side of the vehicle 9 to surely restart the charging.

The control part 20 blocks the supply of electric current to the second coil 222, and then immediately allows the relay circuit 21 to be situated in the ON-state. Also, the side of the vehicle 9 judges that the charging connector 11 is engaged to the vehicle inlet 91 so as to allow the relay circuit 922 to be situated in the ON-state. Due to this, the charging to the vehicle 9 is restarted.

On the other hand, in case that the vehicle 9 outputs the voltage when the charging voltage is applied to the first terminal 911 and the second terminal 912 and the ignition switch is situated in the ON-state, the control part 20 allows the relay circuit 21 to be situated in the ON-state in a state that the connection state of the switching circuit 22 is situated in the first connection state. Depending on this, the direct current power supply 923 outputs the power supply voltage, and the vehicle 9 that has detected the proximity of the charging connector 11 to the vehicle inlet 91 allows the relay circuit 922 to be situated in the ON-state so as to restart the charging to the vehicle 9. The control part 20 confirms that the charging has been restarted by the current sensor 24 and detects that the voltage of the direct current power supply 923 has been output in this charging state by the first voltmeter $V_1$, and then the control part 20 carries out the power distribution to the first coil 221 so as to allow the switching circuit 22 to be situated in the second connection state.

By allowing the switching circuit 22 to be situated in the second connection state, the control part 20 is situated in a state that the proximity and disengagement of the charging connector 11 to/from the vehicle inlet 91 can be detected.

Functions and Advantages of First Embodiment

According to the first embodiment explained above, the following functions and advantages can be obtained.

(1) By allowing the vehicle 9 to recognize that the charging connector 11 is disengaged from the vehicle inlet 91 in a state that actually the charging connector 11 and the vehicle inlet 91 are engaged to each other, the charging can be interrupted without allowing the vehicle 9 to inform abnormality thereof and in a state that subsequently the charging can be restarted.

(2) When the charging is restarted, by the operation of the control part 20 and the switching circuit 22 without the need for any operation by the user of the vehicle battery charger 1 (the driver of the vehicle 9 or the like), the charging can be restarted.

(3) In the charging stand, when electricity consumption nearly exceeds the rated value or the like based on increase in load of the charging to a plurality of vehicles, by temporarily stopping the charging to a part of the vehicles, it is possible to prevent the condition that the electricity consumption exceeds the rated value, and simultaneously it becomes possible to continue the charging to the other part of the vehicles.

Second Embodiment

Figure 5:
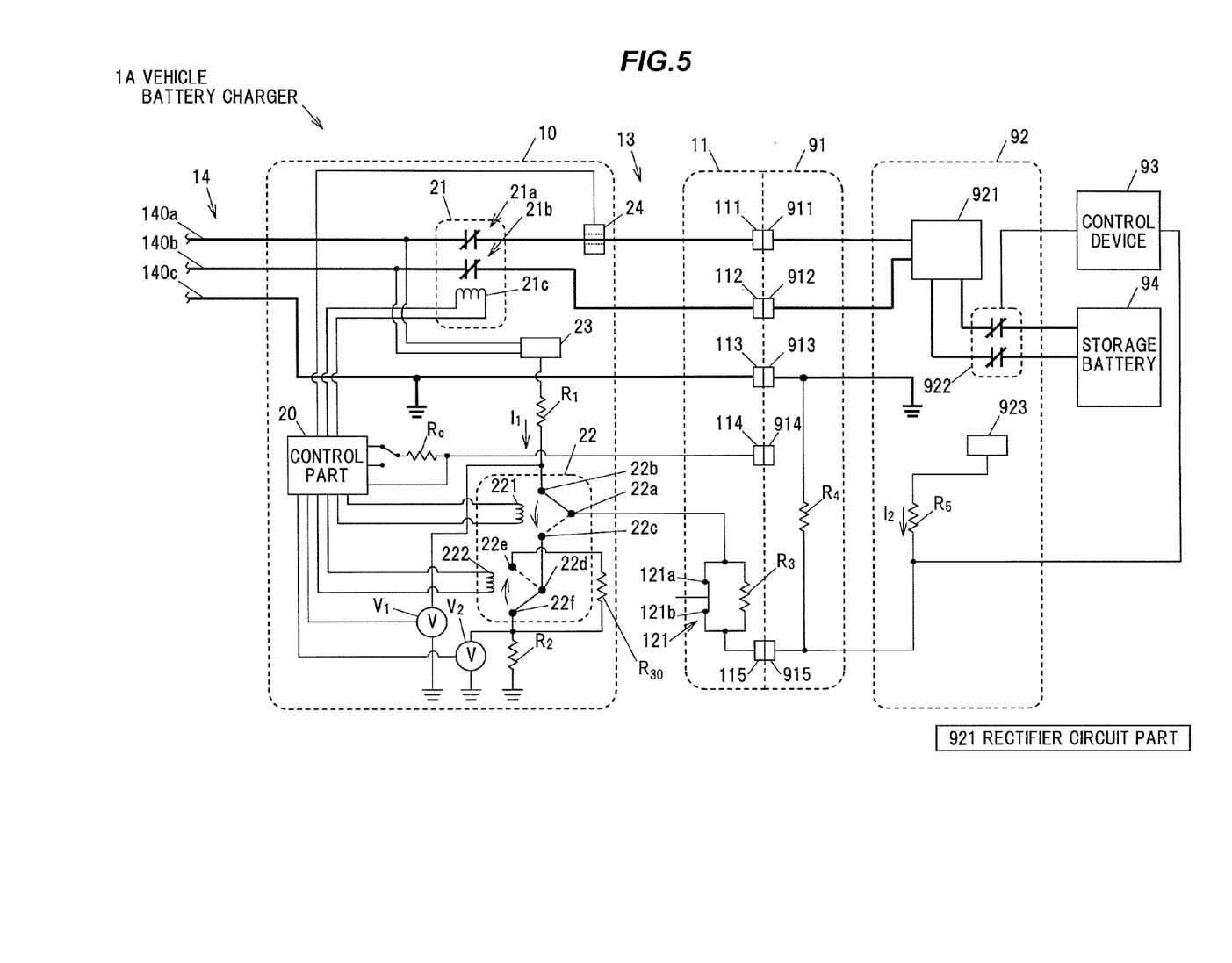
FIG. 5 is a circuit diagram schematically showing a configuration of a vehicle battery charger according to a second embodiment and a vehicle.

Next, the second embodiment of the invention will be explained referring to FIG. 5. FIG. 5 is a circuit diagram schematically showing a configuration of the vehicle battery charger 1A according to the second embodiment, and the vehicle inlet 91, the charging control circuit 92, the control device 93 and the storage battery 94 in the side of the vehicle 9. Hereinafter, in FIG. 5, with regard to the elements that have a function in common with that explained in the first embodiment, the same references as those used in the first embodiment will be used, and overlapping explanation will be omitted.

The first embodiment has a configuration that the fifth contact 22e of the switching circuit 22 is situated in an insulated state, but the embodiment has a configuration that the sixth resistor $R_{30}$ is connected between the fifth contact 22e of the switching circuit 22 and the second resistor $R_2$. The other configurations are equal to those of the first embodiment. The sixth resistor $R_{30}$ has a resistance value of, for example, 150Ω that is equal to the resistance value of the third resistor $R_3$.

The first embodiment is configured to allow the vehicle 9 to recognize that the charging connector 11 is disengaged, when the charging is interrupted, but the embodiment is configured to allow the vehicle 9 to recognize that the release button 120 (refer to FIG. 1) of the charging gun 12 is pushed by the simulation operation device comprised of the control part 20 and the switching circuit 22. The operation of the simulation operation device at the time of interruption, waiting and restart of the charging is identical to that of the first embodiment.

When the power distribution to the second coil 222 is carried out and the switching circuit 22 is situated in the third connection state at the time of interruption of the charging, the P terminal 115 is connected to the reference potential of the charger main body 10 via the switch 121, the switching circuit 22, the sixth resistor $R_{30}$, and the second resistor $R_2$. Since the release button 120 is not pushed at the time of interruption of the charging, the two contacts 121a, 121b of the switch 121 are situated in the short-circuited state. Consequently, the resistance value between the P terminal 115 and the reference potential of the charger main body 10 becomes the total resistance value of the sixth resistor $R_{30}$ and the second resistor $R_2$ (for example, 150Ω+330Ω=480Ω).

The above-mentioned resistance value is identical to the resistance value between the P terminal 115 and the reference potential of the charger main body 10 when the release button 120 is pushed in the second connection state of the switching circuit 22. Accordingly, when the switching circuit 22 is situated in the third connection state, the control device 93 judges that the release button 120 is pushed (the switch 121 is situated in the open-state), even if actually the release button 120 is not pushed, so as to allow the relay circuit 922 to be situated in the OFF-state as mentioned above. The control part 20 confirms that the output of the charging current to the vehicle 9 is stopped or reduced by the current sensor 24, so as to allow the relay circuit 21 to be situated in the OFF-state.

After that, in case that the vehicle 9 always outputs the voltage of the direct current power supply 923, the control part 20 blocks the supply of electric current to the second coil 222 and allows the switching circuit 22 to be situated in the second connection state, so as to allow the vehicle 9 to wait the charging. In addition, in case that the vehicle 9 outputs the voltage when the charging voltage is applied to the first terminal 911 and the second terminal 912 and the ignition switch is situated in the ON-state, the control part 20 blocks the supply of electric current to the first coil 221 and the second coil 222 and allows the switching circuit 22 to be situated in the first connection state, so as to allow the vehicle 9 to wait the charging. As mentioned above, the blocking of the current supply to the first coil 221 and the second coil 222 can be carried out intermittently at regular time intervals, or can be also carried out on receiving a command from an integration controller that integrates the whole of the charging stand.

At the time of restart of the charging, in case that the vehicle 9 always outputs the voltage of the direct current power supply 923, the control part 20 once carries out the power distribution to the second coil 222, and after a predetermined time, blocks the supply of electric current to the second coil 222. The power distribution time to the second coil 222 is a time that the vehicle 9 can surely recognize the change of the connection state of the switching circuit 22 (the change of the voltage of one end of the fifth resistor $R_5$), for example, not less than 1 second, preferably 3 to 5 seconds. Due to this, the vehicle battery charger 1 (the simulation operation device comprised of the control part 20 and the switching circuit 22) allows the control device 93 of the vehicle 9 to detect a state that the release button 120 is once pushed and after that it is returned in a simulated state.

The control part 20 blocks the supply of electric current to the second coil 222, and then immediately allows the relay circuit 21 to be situated in the ON-state. Also, the side of the vehicle 9 judges that the release button 120 is once pushed and after that it is returned so as to allow the relay circuit 922 to be situated in the ON-state. Due to this, the charging to the vehicle 9 is restarted.

On the other hand, in case that the vehicle 9 outputs the voltage when the charging voltage is applied to the first terminal 911 and the second terminal 912 and the ignition switch is situated in the ON-state, the control part 20 allows the relay circuit 21 to be situated in the ON-state in a state that the connection state of the switching circuit 22 is situated in the first connection state. Depending on this, the direct current power supply 923 outputs the power supply voltage, and the vehicle 9 that has detected the proximity of the charging connector 11 to the vehicle inlet 91 allows the relay circuit 922 to be situated in the ON-state so as to restart the charging to the vehicle 9. The control part 20 confirms that the charging has been restarted by the current sensor 24 and detects that the voltage of the direct current power supply 923 has been output in this charging state by the first voltmeter $V_1$, and then the control part 20 carries out the power distribution to the first coil 221 so as to allow the switching circuit 22 to be situated in the second connection state.

As mentioned above, according to the embodiment, by allowing the vehicle 9 to recognize that the release button 120 is pushed in a state that actually the release button 120 is not pushed, the charging can be interrupted without allowing the vehicle 9 to inform abnormality thereof and in a state that subsequently the charging can be restarted. In addition, when the charging is restarted, by the operation of the control part 20 and the switching circuit 22 without the need for any operation by the user of the vehicle battery charger 1 (the driver of the vehicle 9 or the like), the charging can be restarted.

Figure 6:
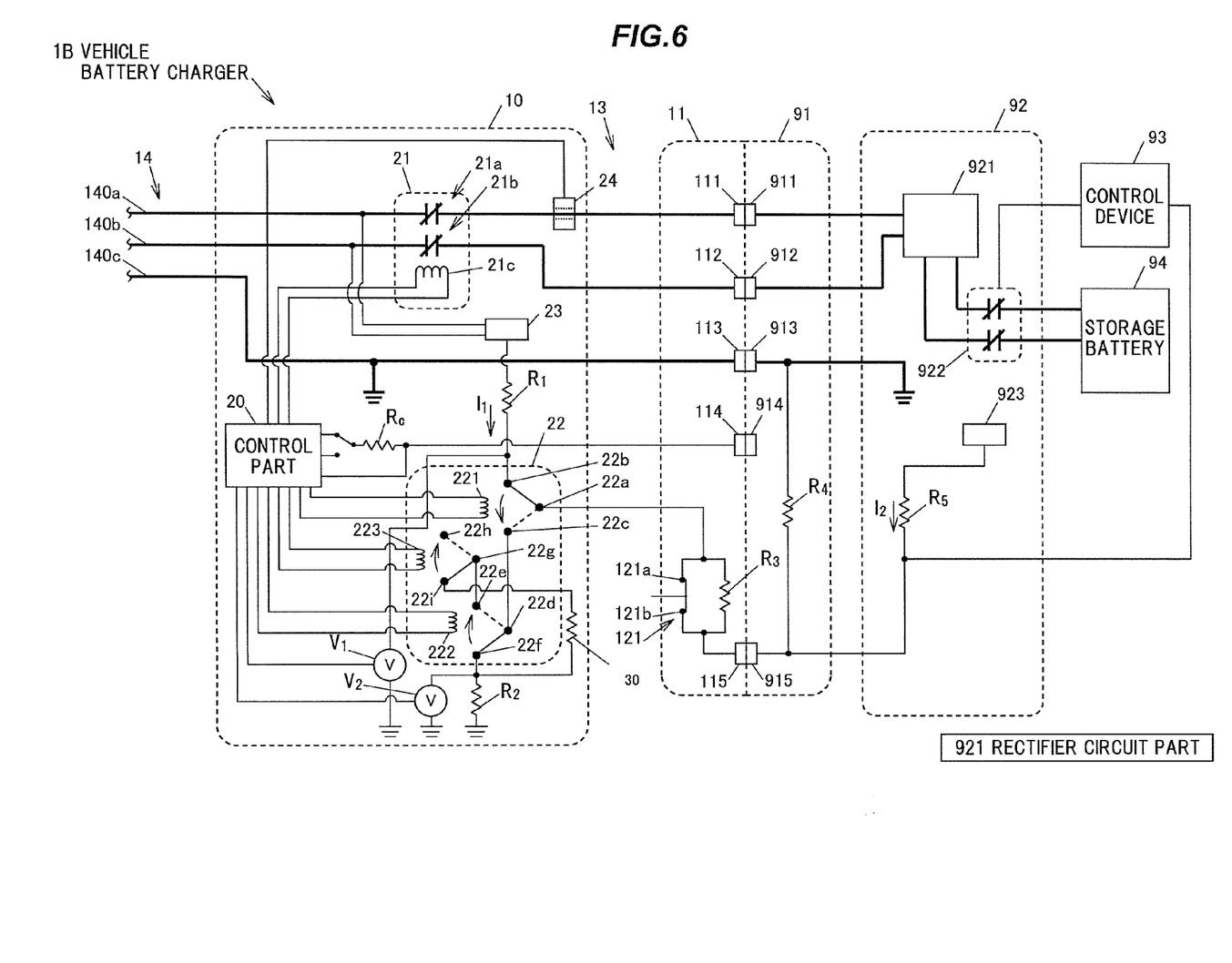
FIG. 6 is a circuit diagram schematically showing a configuration of a vehicle battery charger according to a third embodiment and a vehicle.

Next, the third embodiment of the invention, will be explained referring to FIG. 6. FIG. 6 is a circuit diagram schematically showing a configuration of the vehicle battery charger 1B according to the third embodiment, and the vehicle inlet 91, the charging control circuit 92, the control device 93 and the storage battery 94 in the side of the vehicle 9. Hereinafter, in FIG. 6, with regard to the elements that have a function in common with that explained in the first embodiment, the same references as those used in the first embodiment will be used, and overlapping explanation will be omitted.

The embodiment is configured such that the switching circuit 22 includes the third coil 223 in addition to the first coil 221 and the second coil 222. In addition, the embodiment is configured such that the seventh contact 22g, the eighth contact 22h and the ninth contact 22i in addition to the first to sixth contacts 22a to 22f. The seventh contact 22g is connected to the fifth contact 22e in the switching circuit 22. The eighth contact 22h is connected to none of the other circuit elements both inside and outside of the switching circuit 22 so as to be electrically isolated. The ninth contact 22i is connected to one end of the sixth resistor $R_{30}$.

When the power distribution is carried out to the first coil 221 and the second coil 222, the switching circuit 22 according to the embodiment makes it possible to switch to a configuration in any one of two states simulating that the charging connector 11 is disengaged and that the release button 120 is pushed, based on the power distribution or no power distribution to the third coil 223. At the time of the power distribution to the third coil 223, the seventh contact 22g is connected to the eighth contact 22h, in the state, when the power distribution is carried out to the first coil 221 and the second coil 222, the state simulating that the charging connector 11 is disengaged is configured. In addition, at the time of no power distribution to the third coil 223, the seventh contact 22g is connected to the ninth contact 22i, in the state, when the power distribution is carried out to the first coil 221 and the second coil 222, the state simulating that the release button 120 is pushed is configured.

This makes it possible to, for example, switch whether the power distribution is carried out to the third coil 223 or not according to the type of vehicle. In addition, this makes it possible to, for example, simulate a state that the charging connector 11 is disengaged from the vehicle inlet 91 after the release button 120 is pushed.

As mentioned above, also according to the embodiment, the same action and advantage as those of the first and second embodiments can be obtained.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

In particular, for example, the first to third embodiments are configured such that the function of the switching circuit 22 is realized by a plurality of relay elements realize, not limited to this, the function of the switching circuit 22 can be realized by a semiconductor switching element such as transistor. In addition, in the first to third embodiments, a case that the execution and stop of the charging to the storage battery 94 in the side of the vehicle 9 are switched by a closing or opening operation of the relay circuit 922 is explained, but not limited to this, the execution and stop of the charging can be switched by an ON or OFF operation of a semiconductor switching element such as power transistor.

What is claimed is:

1. A vehicle battery charger including a connector for charging a vehicle, the vehicle comprising a storage battery and a relay circuit configured to start or stop charging to the storage battery by becoming a closed state or an opened state, the connector having a proximity detection terminal, the vehicle being operable to detect a disengagement of the connector or a preparing operation of the disengagement of the connector by a change in an electric current value of a sensing electric current output from the proximity detection terminal of the connector and to stop the charging of the storage battery of the vehicle upon the detection, the vehicle battery charger comprising:
   a charging device connected to the connector and configured to charge the vehicle, comprising
      a simulation operation device comprising a switching device, the simulation operation device configured to change the electric current value by switching a pathway of the sensing electric current output from the proximity detection terminal of the connecter while the connector is still in engagement and the preparing operation of the disengagement of the connecter is not yet carried out, thereby setting the relay circuit of the vehicle at the opened state to cause the vehicle to stop charging the storage battery, wherein said switching device changes said value of the sensing electric current output from said proximity detection terminal of the connector in response to a control signal;
   a switching circuit comprising at least a first switching section and a second switching section,
      the first switching section comprising a first contact connected to the proximity detection terminal via a parallel circuit in which a switch disposed in a charging gun and a first resistor are connected in parallel, and
      the second switching section comprising a fourth contact configured to be connected to the first contact depending on a switching state of the first switching section;
   wherein when a switching state of the first switching section is changed from a first connection state to a second connection state in which the first contact is connected to the fourth contact, a control device on the side of the vehicle can detect that a release button of the charging gun has been pushed, and
   when the switching state of the second switching section from the second connection state to a third connection state in which a fifth contact is connected to no other circuit element in the switching circuit, the control device judges that the connector is disengaged from a vehicle inlet even when the connector is actually not disengaged from the vehicle inlet.

2. The vehicle battery charger according to claim 1, wherein the simulation operation device is configured to cause the vehicle to detect the disengagement of the connecter by blocking the pathway of the electric current output from the proximity detection terminal of the connecter.

3. The vehicle battery charger according to claim 1, wherein the simulation operation device is configured to cause the vehicle to detect the preparing operation of the disengagement of the connecter by switching the pathway of the electric current output from the proximity detection terminal of the connecter such that the electric current value of the electric current is equal to the electric current value obtained when the preparing operation has been carried out.

4. The vehicle battery charger according to claim 1, wherein the simulation operation device is capable of selecting blocking the pathway of the electric current output from the proximity detection terminal of the connecter, or switching the pathway of the electric current output from the proximity detection terminal of the connecter such that the electric current value of the electric current is equal to the electric current value obtained when the preparing operation has been carried out.

5. The vehicle battery charger according to claim 1, wherein the simulation operation device is configured to cause the vehicle to detect the disengagement of the connecter by blocking the pathway of an electric proximity signal that indicates that the connector is electrically connected to the relay circuit of the vehicle.

6. A vehicle battery charger including a connector for charging a vehicle, the vehicle comprising a storage battery and a relay circuit configured to start or stop charging to the storage battery by becoming a closed state or an opened state, the connector having a proximity detection terminal, the vehicle being operable to detect a disengagement of the connecter or a preparing operation of the disengagement of the connector by a change in an electric current value of a sensing electric current output from the proximity detection terminal of the connecter and to stop the charging of the storage battery of the vehicle upon the detection, the vehicle battery charger comprising:

a charging device connected to the connector and configured to charge the vehicle, comprising
a simulation operation device comprising a switching device, the simulation operation device configured to change the electric current value by switching a pathway of the sensing electric current output from the proximity detection terminal of the connecter while the connecter is still in engagement and the preparing operation of the disengagement of the connecter is not yet carried out, thereby setting the relay circuit of the vehicle at the opened state to cause the vehicle to stop charging the storage battery, wherein said switching device changes said value of the sensing electric current output from said proximity detection terminal of the connecter in response to a control signal:
a switching circuit comprising at least
a first switching section comprising a first contact connected to the proximity detection terminal via a parallel circuit in which a switch disposed in a charging gun and a first resistor are connected in parallel, and
a second switching section comprising a fourth contact configured to be connected to the first contact depending on a switching state of the first switching section;
wherein when a switching state of the first switching section is changed from a first connection state to a second connection state in which the first contact is connected to the fourth contact, a control device on the side of the vehicle can detect that a release button of the charging gun has been pushed, and
when the switching state of the second switching section from the second connection state to a third connection state in which a fourth contact is connected to a second resistor, the control device judges that the release button is pushed even when the release button is not actually pushed.

* * * * *